United States Patent
Chen et al.

(10) Patent No.: US 7,398,317 B2
(45) Date of Patent: Jul. 8, 2008

(54) THWARTING CONNECTION-BASED DENIAL OF SERVICE ATTACKS

(75) Inventors: Benjie Chen, Brookline, MA (US); Massimiliano Antonio Poletto, Cambridge, MA (US)

(73) Assignee: Mazu Networks, Inc., Cambridge, MA (US)

( * ) Notice: Subject to any disclaimer, the term of this patent is extended or adjusted under 35 U.S.C. 154(b) by 1370 days.

(21) Appl. No.: 09/946,787

(22) Filed: Sep. 5, 2001

(65) Prior Publication Data

US 2002/0103916 A1 Aug. 1, 2002

Related U.S. Application Data

(60) Provisional application No. 60/230,759, filed on Sep. 7, 2000.

(51) Int. Cl.
*G06F 15/16* (2006.01)
(52) U.S. Cl. .................. 709/229; 709/203; 709/227; 709/237; 713/153; 370/401
(58) Field of Classification Search ......... 709/202–203, 709/225–229, 237–239, 223–224; 370/328, 370/338, 400–401; 713/153, 188; 726/22–25
See application file for complete search history.

(56) References Cited

U.S. PATENT DOCUMENTS

| | | | |
|---|---|---|---|
| 5,796,956 A | | 8/1998 | Jones |
| 6,061,341 A | * | 5/2000 | Andersson et al. .......... 370/338 |
| 6,061,789 A | | 5/2000 | Hauser et al. |
| 6,108,782 A | | 8/2000 | Fletcher et al. |
| 6,279,113 B1 | | 8/2001 | Vaidya |
| 6,301,668 B1 | | 10/2001 | Gleichauf et al. |
| 6,304,262 B1 | | 10/2001 | Maloney et al. |
| 6,321,338 B1 | | 11/2001 | Porras et al. |
| 6,353,385 B1 | | 3/2002 | Molini et al. |
| 6,370,116 B1 | | 4/2002 | Giroux et al. |
| 6,381,649 B1 | | 4/2002 | Carlson |
| 6,388,992 B2 | | 5/2002 | Aubert et al. |
| 6,389,448 B1 | * | 5/2002 | Primak et al. ............... 709/229 |
| 6,442,694 B1 | | 8/2002 | Bergman et al. |
| 6,535,484 B1 | | 3/2003 | Hughes et al. |

(Continued)

OTHER PUBLICATIONS

"Analysis of a Denial of Service Attack on TCP", Schuba et al., Proceedings of the 1997 IEEE Symposium on Security and Privacy (IEEE Computer Society Press, May 1997), 16 pps.

(Continued)

*Primary Examiner*—Bharat Barot
(74) *Attorney, Agent, or Firm*—Fish & Richardson P.C.

(57) ABSTRACT

A system architecture for thwarting denial of service attacks on a victim data center is described. The system includes a first plurality of monitors that monitor network traffic flow through the network. The first plurality of monitors is disposed at a second plurality of points in the network. The system includes a central controller that receives data from the plurality of monitors, over a hardened, redundant network. The central controller analyzes network traffic statistics to identify malicious network traffic. In some embodiments of the system, a gateway device is disposed to pass network packets between the network and the victim site. The gateway is disposed to protect the victim site, and is coupled to the control center by the redundant hardened network.

28 Claims, 10 Drawing Sheets

U.S. PATENT DOCUMENTS

| | | | |
|---|---|---|---|
| 6,597,661 | B1 | 7/2003 | Bonn |
| 6,597,957 | B1 | 7/2003 | Beakley |
| 6,678,827 | B1 | 1/2004 | Rothermel et al. |
| 6,691,213 | B1 | 2/2004 | Luu et al. |
| 6,725,378 | B1 | 4/2004 | Schuba et al. |
| 6,738,814 | B1 | 5/2004 | Cox et al. |
| 6,775,657 | B1 | 8/2004 | Baker |
| 6,789,203 | B1 | 9/2004 | Belissent |
| 6,807,667 | B1 | 10/2004 | Bar et al. |
| 6,816,910 | B1 * | 11/2004 | Ricciulli ................ 709/229 |
| 6,848,005 | B1 | 1/2005 | Plevyak et al. |
| 2002/0023089 | A1 | 2/2002 | Woo |
| 2002/0031134 | A1 | 3/2002 | Poletto et al. |
| 2002/0035628 | A1 | 3/2002 | Gil et al. |
| 2002/0095492 | A1 | 7/2002 | Kaashoek et al. |
| 2002/0103916 | A1 | 8/2002 | Chen et al. |

OTHER PUBLICATIONS

Communications News, Jun. 2000, 37, 6, 48.
McFadden, Oct. 25, 2000, Ent, 5, 17, 22.
Greene, Feb. 16, 1998, p. 20.
Johnson, Nov. 27, 2000, Network World.
Martin, Aug. 14, 2000, Network World, p. 86.
Snyder, Jul. 19, 1999, Network World, p. 53.
Mell, P. et al., "Mobile Agent Attack Resistant Distributed Hierarchical Intrusion Detection Systems," RAID 1999, Sep. 99, pp. 1-8.
Messmer, E., "Security needs spawn services—Managed detection services growing in popularity", Network World, Apr. 2000, Retrieved from the Internet on May 8, 2005: <networkworld.com/news/2000/0403,intrusion.html>.
Mansfield et al., "Towards trapping wily intruders in the large", RAID 1999, Sep. 99, pp. 1-13.
Stallings, William, "Cryptography and Network Security", *Principles and Practice*, 2$^{nd}$ Edition, Intruders and Viruses, Chapter 15, pp. 478-501, date unknown.
Roesch, Martin, "Snort—Lightweight Intrusion Detection for Networks", Proceedings of LISA XIII '99: 13$^{th}$ Systems Administration Conference, Nov. 7-12, 1999, pp. 229-238.
Ohta et al., "Detection, Defense, and Tracking of Internet-Wide Illegal Access in a Distributed Manner", Internet Society, Jul. 18-21, 2000, Retrieved from the Internet on Oct. 27, 2004: <isoc.org/inet2000/edproceedings/1f/1f_2.htm>.

* cited by examiner

US 7,398,317 B2

THWARTING CONNECTION-BASED DENIAL OF SERVICE ATTACKS

This application claims the benefit of U.S. Provisional Patent application Ser. No. 60/230,759, filed Sep. 7, 2000, entitled "THWARTING DENIAL OF SERVICE ATTACKS".

BACKGROUND

This invention relates to techniques to thwart network-related denial of service attacks.

In denial of service attacks, an attacker sends a large volume of malicious traffic to a victim. In one approach an attacker, via a computer system connected to the Internet infiltrates one or a plurality of computers at various data centers. Often the attacker will access the Internet through an Internet Service Provider (ISP). The attacker by use of a malicious software program places the plurality of computers at the data centers under its control. When the attacker issues a command to the computers at the data centers, the machines send data out of the data centers at arbitrary times. These computers can simultaneously send large volumes of data over various times to the victim preventing the victim from responding to legitimate traffic.

One type of attack is a transport control protocol (TCP) SYN flood attack. With the transport control protocol (TCP) a connection between two hosts on the network is initiated via a three-way handshake. During a TCP SYN flood attack, an attacker will send many SYN packets to victim.

One approach is described in "Analysis of a denial of service attack on TCP" by Schuba et al. Proceedings of the 1997 IEEE Symposium on Security and Privacy (IEEE Computer Society Press, May 1997). This paper analyzes a network-based denial of service attack for IP (Internet Protocol) based networks. The paper provides an approach for protection against SYN flooding attacks for all connected to the same local area network. The approach recognizes that the attacking site generally will not respond by sending ACK packets to the victim in response to the victim sending corresponding SYN ACK packets.

SUMMARY

According to an aspect of the present invention, a method of defending a server against SYN flood attacks executed on a device includes during a connection setup initiated by sending a SYN packet from a client to a server and forwarding a received SYN ACK packet from the server to the client and immediately sending a ACK packet to the server. The method also includes maintaining the connection open for a variable timeout period and if an ACK packet does not arrive from the client to server, sending a RST to the server to cause the server to close the connection. The method also includes if the ACK packet does arrive from the client to the server, forwarding the ACK to the server and maintain the connection.

According to an additional aspect of the present invention, a method of defending a server against SYN flood attacks includes during a connection setup initiated by sending a SYN packet from a client to a server, tracking ratios of SYNs to SYN ACKs and SYN ACKs to ACKs and comparing the ratios to threshold values; and sending an alarm to a control center when at least one of the ratios exceeds a threshold value to indicate to the control center that the server is under a SYN flood attack.

According to an additional aspect of the present invention, a gateway device disposed between a data center and a network for thwarting denial of service attacks on the data center includes a computing device that executes a monitoring process. The monitoring process monitors network connection setups initiated by sending SYN packets from a client to the data center. The monitoring process includes a SYN ACK forward process to forward received SYN ACK packets from the server to the client and to immediately send a ACK packet to the server. The method also includes a process to determine a variable time out period that is inversely proportional to number of connections for which expected ACK packets from the client have not been received and a process to maintain the connection open for the variable timeout period. The device includes a process to send a reset packet to the server to cause the server to close the connection when an ACK packet does not arrive from the client to server during the timeout period and a packet forwarding process to forward the ACK packet when the ACK packet is received from the client by the server, and to maintain the connection.

According to an additional aspect of the present invention, a gateway device is disposed between a data center and a network for thwarting denial of service attacks on the data center. The gateway device includes a computing device comprising a monitoring process that monitors network connection setups initiated by sending SYN packets from a client to the data center. The monitoring process includes a process to track ratios of SYNs to SYN ACKs and SYN ACKs to ACKs and compare the ratios to threshold values. The monitoring process sends an alarm to a control center when at least one of the ratios exceeds a threshold value to indicate to the control center that the server is under a SYN flood attack.

According to an additional aspect of the present invention, a computer program product residing on a computer readable medium for defending a server against SYN flood attacks includes instructions to cause the device to forward, in response to a SYN packet received from a client to by server, a SYN ACK packet from the server to the client and immediately sending a ACK packet to the server. The program maintains the connection open for a variable timeout period and closes the connection by sending a RST to the server if an ACK packet does not arrive from the client to server or forwards a received ACK to the server if the ACK packet does arrive from the client to the server and maintain the connection.

According to an additional aspect of the present invention, a computer program product resides on a computer readable medium for defending a server against SYN flood attacks. The computer program product executes on a device and includes instructions to cause the device during a connection setup initiated by sending a SYN packet from a client to a server to track ratios of SYNs to SYN ACKs and SYN ACKs to ACKs. The program also includes instructions to compare the ratios to threshold values and send an alarm message to a control center when at least one of the ratios exceeds a threshold value to indicate to the control center that the server is under a SYN flood attack.

One or more aspects of the invention may provide some or all of the following advantages.

In some embodiments, the invention is in an active configuration. In an active configuration, a gateway device or the like can defend the victim site against SYN flood attacks. A gateway can determine whether or not to close a connection based on a variable timeout period. The variable time out period can be inversely proportional to number of connections for which a corresponding first acknowledge packets (ACK packet) from client has not been received. In some embodiments, when number of non-ACK'ed connections reaches a configurable threshold the gateway will not forward any new SYNs until it finishes sending resets (RSTs) for those connections.

In a passive configuration, a gateway or similar device can track ratios of SYNs to SYN ACKs and SYN ACKs to ACKs, and raise appropriate alarms when a SYN flood attack situation occurs.

DETAILED DESCRIPTION

Figure 1:
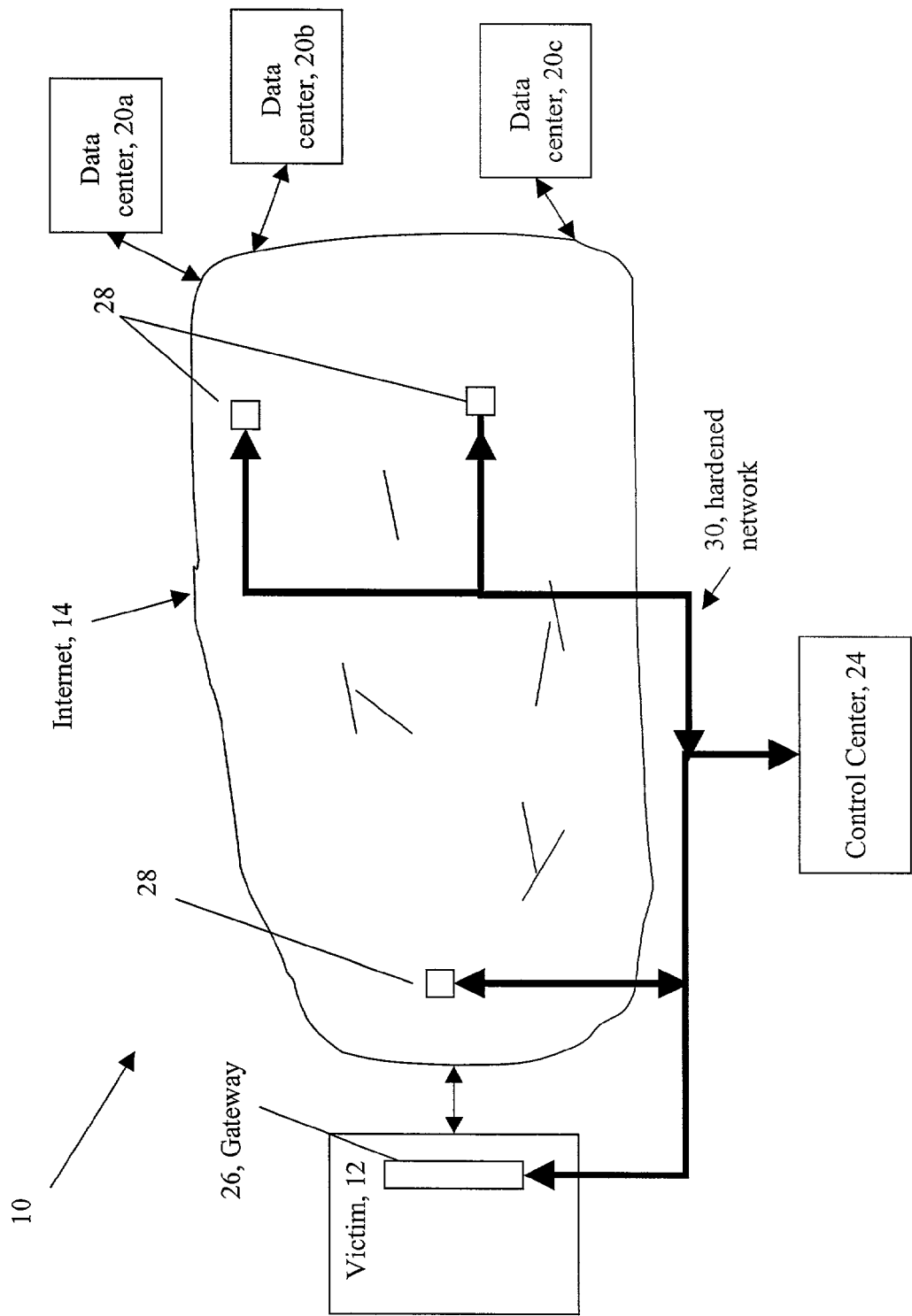
FIG. 1 is a block diagram of networked computers showing an architecture to thwart denial of service attacks.

Referring to FIG. 1, an arrangement 10 to thwart denial of service attacks (DoS attacks) is shown. The arrangement 10 is used to thwart an attack on a victim data center 12, e.g., a web site or other network site under attack. The victim 12 is coupled to the Internet 14 or other network. For example, the victim 12 has a web server located at a data center (not shown).

An attacker via a computer system (not shown) that is connected to the Internet e.g., via an Internet Service Provider (ISP) (not shown) or other approach, infiltrates one or a plurality of computers at various other sites or data centers 20a-20c. The attacker by use of a malicious software program 21 that is generally surreptitiously loaded on the computers of the data centers 20a-20c, places the plurality of computers in the data centers 20a-20c under its control. When the attacker issues a command to the data centers 20a-20c, the data centers 20a-20c send data out at arbitrary times. These data centers 20a-20c can simultaneously send large volumes of data at various times to the victim 12 to prevent the victim 12 from responding to legitimate traffic.

The arrangement 10 to protect the victim includes a control center 24 that communicates with and controls gateways 26 and data collectors 28 disposed in the network 14. The arrangement protects against DoS attacks via intelligent traffic analysis and filtering that is distributed throughout the network. The control center 24 is coupled to the gateways 26 and data collectors 28 by a hardened, redundant network 30. Gateways 26 and data collectors 28 are types of monitors that monitor and collect statistics on network traffic. In preferred embodiments, the network is inaccessible to the attacker. The gateway 26 devices are located at the edges of the Internet 14, for instance, at the entry points of data centers. The gateway devices constantly analyze traffic, looking for congestion or traffic levels that indicate the onset of a DoS attack. The data collectors 28 are located inter alia at major peering points and network points of presence (PoPs). The data collectors 28 sample packet traffic, accumulate, and collect statistical information about network flows.

All deployed devices e.g., gateways 26 and data collectors 28 are linked to the central control center. The control center aggregates traffic information and coordinates measures to track down and block the sources of an attack. The arrangement uses a distributed analysis emphasizing the underlying characteristics of a DoS attack, i.e., congestion and slow server response, to produce a robust and comprehensive DoS solution. Thus, this architecture 10 can stop new attacks rather than some solutions that can only stop previously seen attacks. Furthermore, the distributed architecture 10 will frequently stop an attack near its source, before it uses bandwidth on the wider Internet 14 or congests access links to the targeted victim 12.

A virus is one way to get attacks started. When surfing the web page a user may download something, which contains a virus that puts the user's computer under the control of some hacker. In the future, that machine can be one of the machines that launches the attack. The attacker only needs a sufficient amount of bandwidth to get a sufficient number of requests out to the victim 12 to be malicious.

Figure 2:
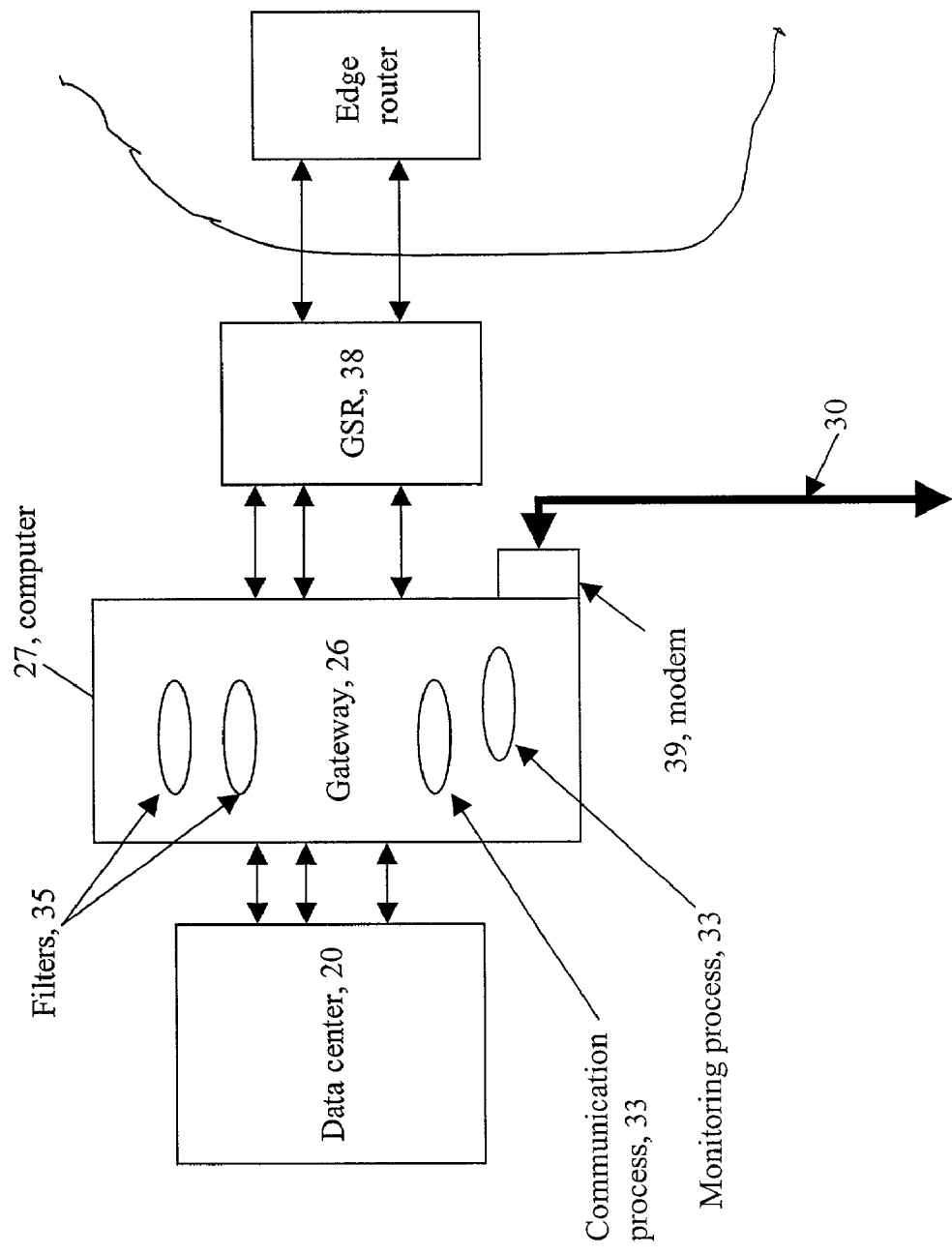
FIG. 2 is a block diagram depicting details of placement of a gateway.

Referring to FIG. 2, details of an exemplary deployment of a gateway is shown. Other deployments are possible and the details of such deployments would depend on characteristics of the site, network, cost and other considerations. The gateway 26 is a program executing on a device, e.g., a computer 27 that is disposed at the edge of the data center 20 behind an edge router at the edge of the Internet 14. Additional details on the gateway 26 are discussed below and in the APPENDIX A. In a preferred embodiment, a plurality of gateway devices are deployed at a corresponding plurality of locations, e.g., data centers or sites over the network, e.g., the Internet 14. There can be one gateway or a plurality of gateways at each data center, but that is not necessarily required.

The gateway 26 includes a monitoring process 32 (FIG. 6B) that monitors traffic that passes through the gateway as well as a communication process 33 that can communicate statistics collected in the gateway 26 with the data center 24. The gateway uses a separate interface over a private, redundant network, such as a modem 39 to communicate with the control center 24 over the hardened network 30. Other interface types besides a modem are possible. In addition, the gateway 26 can include processes 35 to allow an administrator to insert filters to filter out, i.e., discard packets that the device deems to be part of an attack, as determined by heuristics described below.

An attack can be designed to either overload the servers or overload some part of the network infrastructure inside the victim site 12. Thus, the victim site 12 can include routers, switches, load balancers and other devices inside the data center that can be targeted by the attack. A particularly troublesome attack causes overload of upstream bandwidth. Upstream bandwidth is the capacity between the victim 12 data center 12a and one or a plurality of routers or switches belonging to the victim 12 data center's network service provider, which provides connectivity to the rest of the network, e.g., the Internet.

For an exemplary configuration, the victim site 12 can include a plurality of high bandwidth lines feeding a GSR (Gigabit Switch Router). At the output of the GSR are exit ports to various parts of the data center. The GSR is generally very high bandwidth and generally does not crash. The gateway 26 is placed behind the GSR and across some or all of the output ports of the GSR into the data center. This configuration allows the gateway 26 to monitor and control some or all of the traffic entering the data center without the need to provide routing functionality.

Alternatively, a gateway 26 can tap a network line without being deployed physically in line, and it can control network traffic, for example, by dynamically installing filters on nearby routers. The gateway 26 would install these filters on the appropriate routers via an out of band connection, i.e. a serial line or a dedicated network connection. Other arrangements are of course possible.

Figure 3:
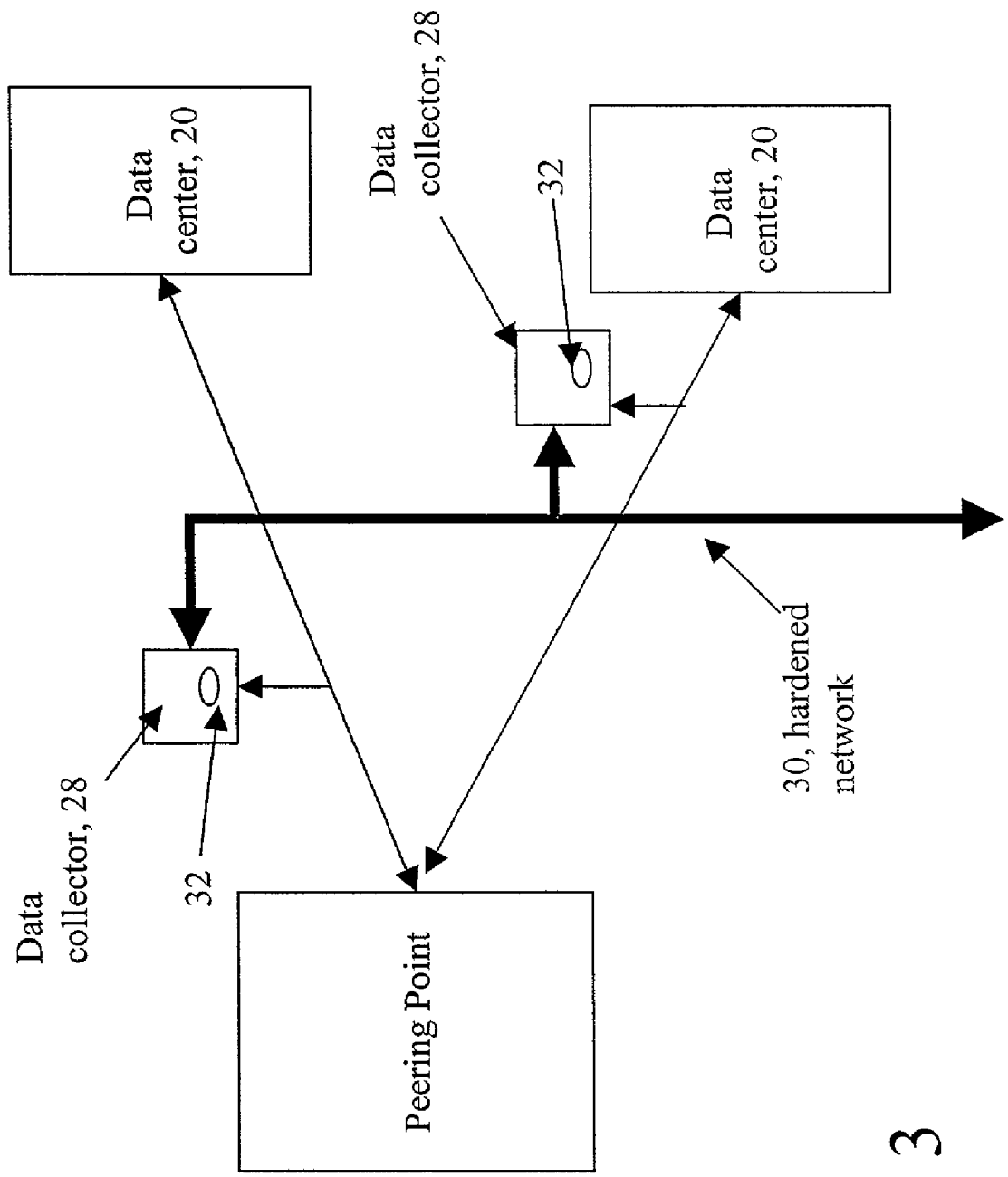
FIG. 3 is a block diagram depicting details of placement of data collectors.

Referring to FIG. 3, data collectors 28 are shown coupled to the network to tap or sample traffic from data centers 20a-20c. Although data collectors 28 can be dispersed throughout the network 14 they can be strategically disposed at peering points, i.e., points where network traffic from two or more different backbone providers meet. The data collectors 28 can also be disposed at points of presence (PoPs). The data collectors 28 monitor and collect information pertaining to network traffic flow. The data collectors process statistics based on monitored network traffic that enters a peering point. Data collectors 28 include a monitoring process 32 (FIG. 6) as well as a communication process that communicates data to the control center over the hardened network 30. One or more data collector devices 28 use the monitoring process to monitor one or more lines that enter the peering point. Each data collector 28 would be able to monitor one or more lines depending on the specifics of how the network is configured and bandwidth requirements.

The gateway 26 and data collector 26 are typically software programs that are executed on devices such as computers, routers, or switches. In one arrangement, packets pass through the gateway 26 disposed at the data center 22a and are sampled by the data collector.

Figure 4:
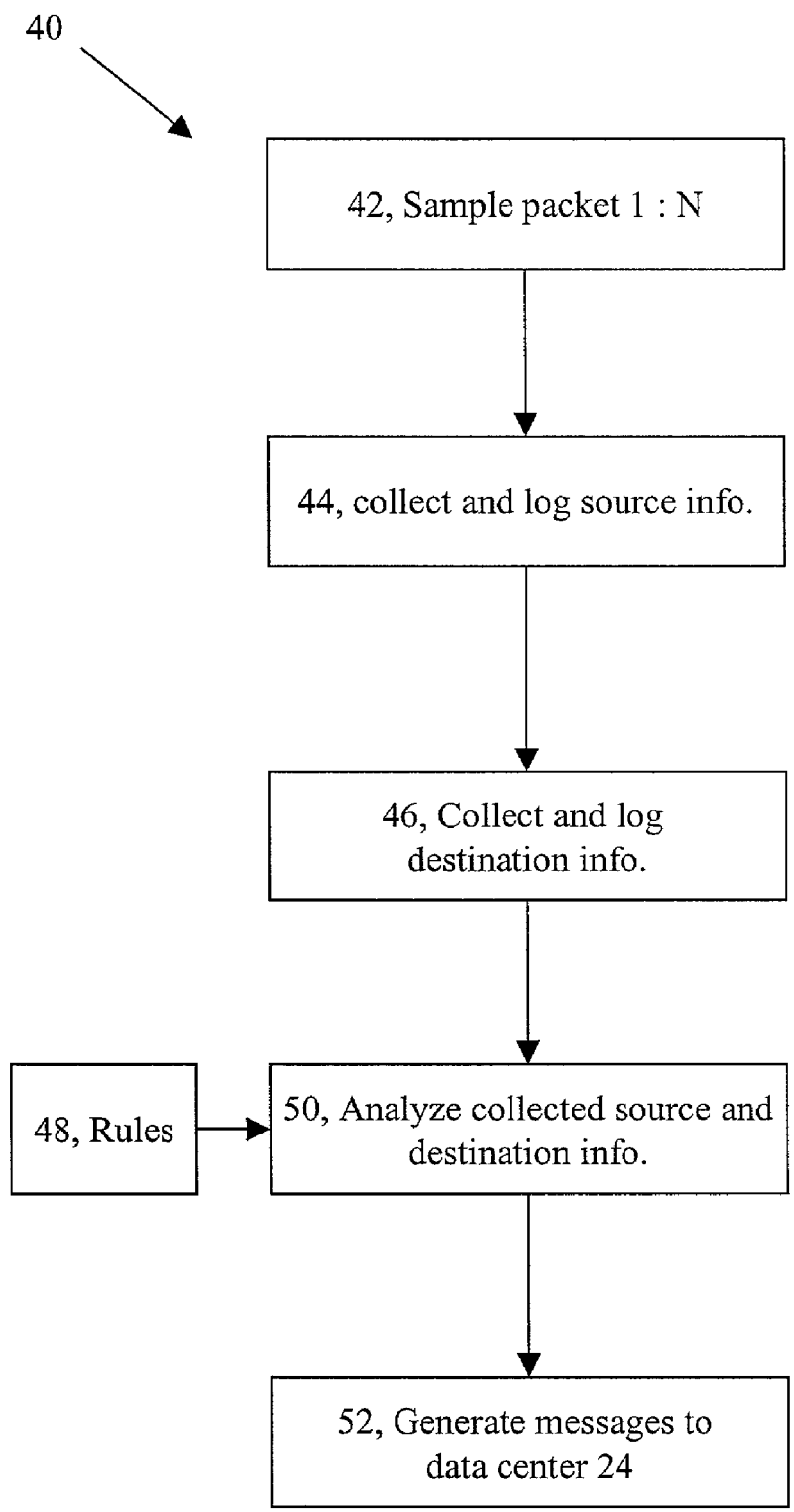
FIG. 4 is flow chart depicting a data collection process.

Referring to FIG. 4, the data collector 26 performs 40 a sampling and statistic collection process 40. The data collector samples 42 one (1) packet in every (n) packets and has counters to collect statistics about every packet. The data collector 26 parses the information in the sampled packet. Information collected includes source information 44, which may be fake or spoofed, e.g., not correct information. It will also include destination information 46, which generally is accurate information. The data collector 28 collects that information but need not log the sampled packets. The data collector 28 maintains a log over a period of time, e.g., in the last hour. As an example, the log that the data collector 26 maintains is a log that specifies that the data collector has seen a certain number of packets, e.g., 10,000 packets of a particular kind, that apparently originated from a particular source(s) that are going to a particular destination.

Based on rules 48 within the data collector 26, the data collector 26 analyzes 50 the collected statistics and may if necessary compose 52 a message that raises an alarm. Alternatively, the data collector can respond to queries concerning characteristics of traffic on the network. Typically, the queries can be for information pertaining to statistics. It can be in the form of an answer to a question e.g., how many packets of a type did the data collector see or it can be a request to down load via the hardened network, the entire contents of the log. One rule is that when the data collector 26 starts sampling, the data collector periodically logs data and produces a log of a large plurality of different network flows over a period of time.

Figure 5:
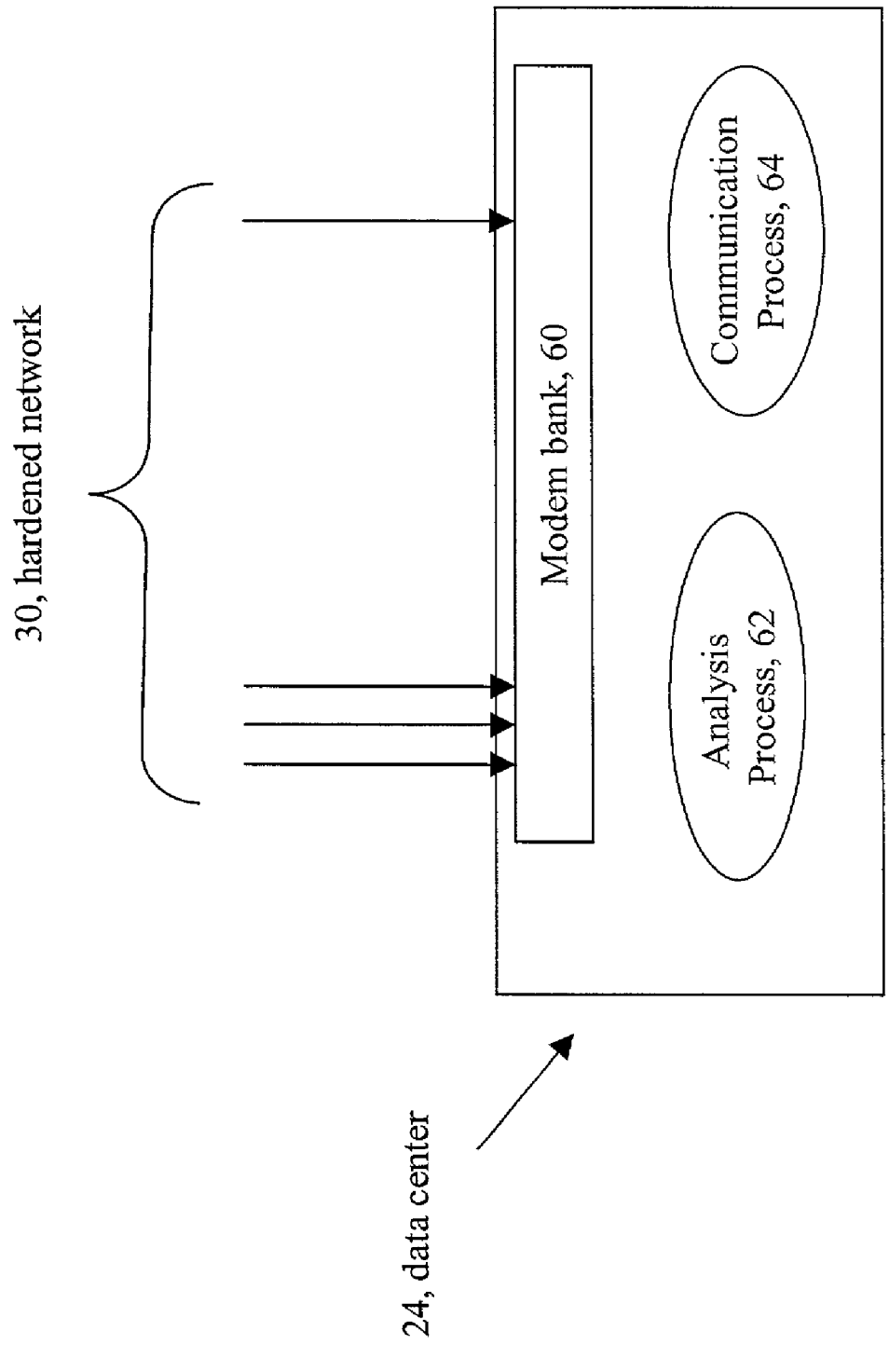
FIG. 5 is a flow chart depicting details of a control center.

Referring to FIG. 5, a deployment for the control center 24 is shown. The control center 24 receives information from one or more gateways 26 and data collectors 28 and performs appropriate analysis using an analysis process 62. The control center is a hardened site.

The control center 24 has multiple upstream connections so that even during an attack it will have other ways to couple to the network 30. Several approaches can be used to harden the site. One approach can use special software between the site and the Internet 14 to make it immune to attack. An approach is to have a physically separate network 30 connected to all of the devices, e.g., gateways 26 and data collectors 28. One exemplary embodiment of that physically separate network 30, which is hardened, is the telephone system. Thus, each one of the data collectors 26 and gateways 26 includes an interface to the separate network, e.g., a modem. The data center 26 also includes a corresponding interface to the separate network, e.g., a modem or a modem bank 60.

With this approach, the redundant network 30 is not accessible to the attacker. The redundant network 30 thus is available to communicate between the data center 24 and data collectors and gateways to coordinate response to an attack. In essence, the network 30 used by the data center to communicate with the data collectors 26 and gateways 26 is not available to the attacker. Alternatively, if less than complete assurance is required, the control center could be resistant to attack and still be connected to the Internet 14.

The analysis process 62 that is executed on the control center 24 analyzes data from the gateways 26 and data collectors 28. The analysis process 62 tries to detect attacks on victim sites. The analysis process 62 views attacks as belonging to, e.g., one of three classes of attack. Herein these classes of attack are denoted as low-grade with spoofing, low-grade without spoofing and high-grade whether spoofing or non-spoofing.

A low-grade attack is an attack that does not take out upstream bandwidth. A low-grade attack does not significantly overburden the links between the Internet 14 and the victim data center 12. The low-grade non-spoofing attack is the simplest type of attack to defend against. It simply requires identifying the source of the attack and a mechanism to notify an administrator at the victim site to install a filter or filters at appropriate points to discard traffic containing the source address associated with the attack.

With a low-grade spoofing-type attack, an attacker sends an IP-packet to a destination but fakes the source address. There is no way to enforce use of an accurate source address by a sender. During a spoofing attack, each one of the attacking machines will send a packet with a fake, e.g., randomly selected or generated source address. Under this type of attack, the victim 12 alone cannot thwart the attack. An administrator at the victim 12 can try to put a filter on a router to stop the packets. However, there is no way for the administrator to guess what the random address of the next packet will be.

The control center 24 also includes a communication process 63 to send data to/from the gateways 26 and data collectors 28. The gateway 26 at the victim 12 contacts the control center and notifies the control center 24 that the victim 12 data center is under a spoofing attack. The gateway 26 identifies itself by network address (e.g., static IP address if on the Internet 14), via a message to the control center 24. The message sent over the hardened network 30 indicates the type of attack, e.g., an attack from addresses that the victim 12 cannot stop because it is a spoofing type of attack. The control center queries data collectors 28 and asks which data collectors 28 are seeing suspicious traffic being sent to the victim 12.

The packets from the attacker will have faked source addresses that will be changing with time. However, the control center can issue a query for this kind of packet by victim destination address. The data collectors 28 reply with the information collected. Based on that collected information from the data collectors 28, the control center can then determine what data centers are performing the spoofing on the victim 12.

In the present configuration, there are two possible sources of attack traffic: either the attacker is behind a gateway 26 or not. If the attacker is behind a gateway 26, the control center issues a request to the appropriate gateway 26 to block the attacking traffic, e.g. by allowing the appropriate gateway 26 to discard traffic, e.g., packets that contain the victim 12 destination address. The gateway 26 stops that traffic in a transparent manner. If the attacker is not behind a gateway 26, data collectors 28 are used to provide information about possible locations of the attackers. The availability of information from data collectors 28 increases the speed with which attackers are discovered. The data collectors 28 are positioned at network switching points that see a high volume of traffic, which minimizes the required number of deployed data collectors.

The high-grade attacks are attacks that take out the link between the victim 12 data center and the Internet 14. With a high-grade attack it does not matter whether the victim 12 is spoofed or not. Under a high-grade attack, the attack requires cooperation just like the low grade spoofing attack. Thus, the same thwarting mechanism is used for either spoofing or non-spoofing, e.g., using information from the data collectors 28 to identify attacking networks. This information is used to either automatically shutdown traffic having the victim's destination address at the appropriate gateways 26 or is used to identify networks or data centers from which the attack is originating and to follow up with calls to the appropriate administrators.

Figure 6:
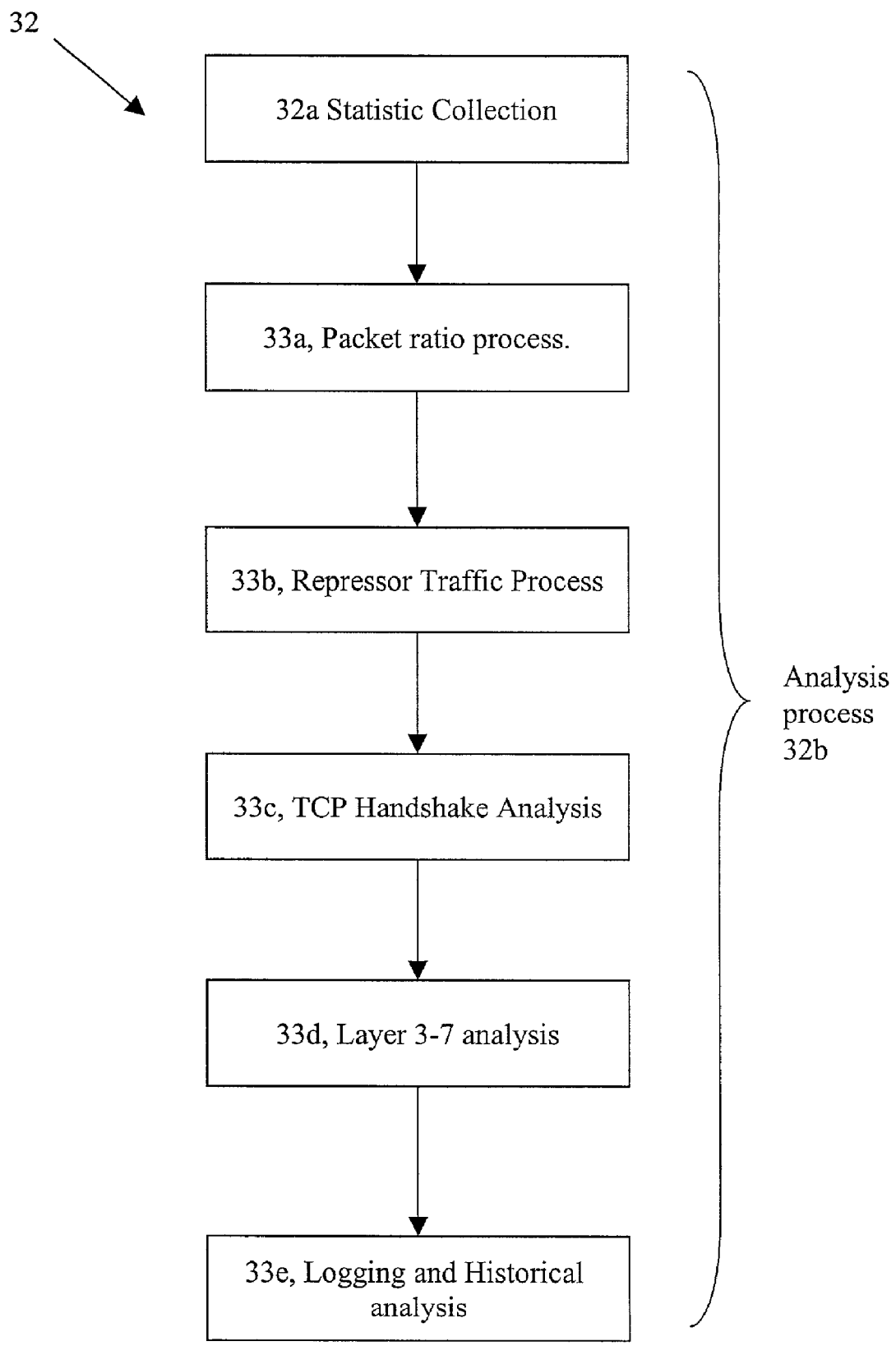
FIG. 6 is a diagram depicting functional layers of a monitoring process.

Referring to FIG. 6, a monitoring process 32 is shown. The monitoring process 32 can be deployed on data collectors 28 as well as gateways 26. The monitoring process 32 includes a process 32a to collect statistics of packets that pass by the data collectors 28 or through the gateways 26. The monitoring process 32 also includes several processes 32b to identify, malicious traffic flows based on the collected statistics as further described below.

Figure 7:
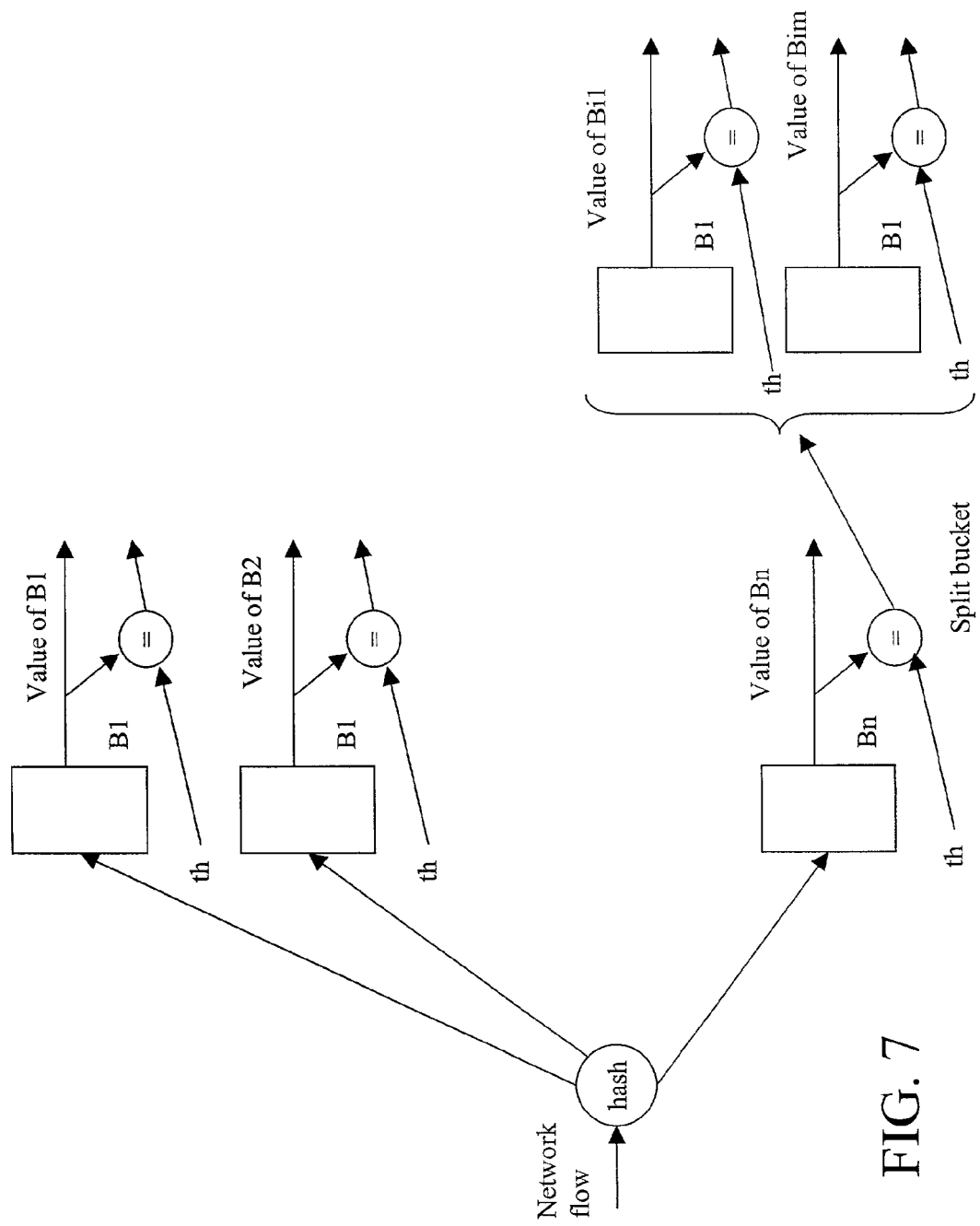
FIG. 7 is a diagram depicting one technique to gather statistics for use in algorithms that determine sources of an attack.

Referring to FIG. 7, the gateways 26 and data collectors 28 are capable of looking at multiple levels of granularity. The gateways 26 and data collectors have monitoring process 32 used to measure some parameter of traffic flow. One goal of the gateways 26 and data collectors 28 is to measure some parameter of network traffic. This information collected by the gateways 26 and data collectors is used to trace the source of an attack.

One of the algorithms to measure parameters of traffic flow divides the traffic flow into buckets. For example, consider one simple parameter, the count of how many packets a data collector or gateway examines. An algorithm to track the count of this parameter starts with a predefined number of buckets, e.g., "N" buckets. The buckets are implemented as storage areas in the memory space of the data collector or gateway device. The algorithm will use some hash function "f(h)", which takes the packet and outputs an integer that corresponds to one of the buckets "$B_1$-$B_N$". Statistics from the packets start accumulating in the buckets "$B_1$-$B_N$". The buckets "$B_1$-$B_N$" are configured with threshold values "Th." As the contents of the buckets $B_1$-$B_N$ reach the configured thresholds values "Th", (e.g., compare values of packet count or packet rate to threshold), the monitoring process 32 deems that event to be of significance. The monitoring process 32 takes that bucket, e.g., $B_i$ and divides that bucket $B_i$ into some other number M of new buckets $B_{i1}$-$B_{iM}$. Each of the new buckets $B_{i1}$-$B_{iM}$ contains values appropriately derived from the original bucket $B_i$. Also, the hash function is extended to map to N+M−1 "h→N+M−1" values, rather than the original N values.

An attack designed to use the algorithm of FIG. 6 against a gateway 26 or a data collector 28 might send packets in such a fashion as to explode the number of buckets. Since each bucket consumes memory space, the attack can be designed to consume all available memory and crash the device, e.g., computer on which the monitoring process 32 executes. There are ways of preventing that type of attack on the monitoring process 32. One way is to make the hash function change periodically, e.g., randomly. Also the hash function is secret so that the packets are reassigned to different buckets in ways unknown to the attackers.

Figure 8:
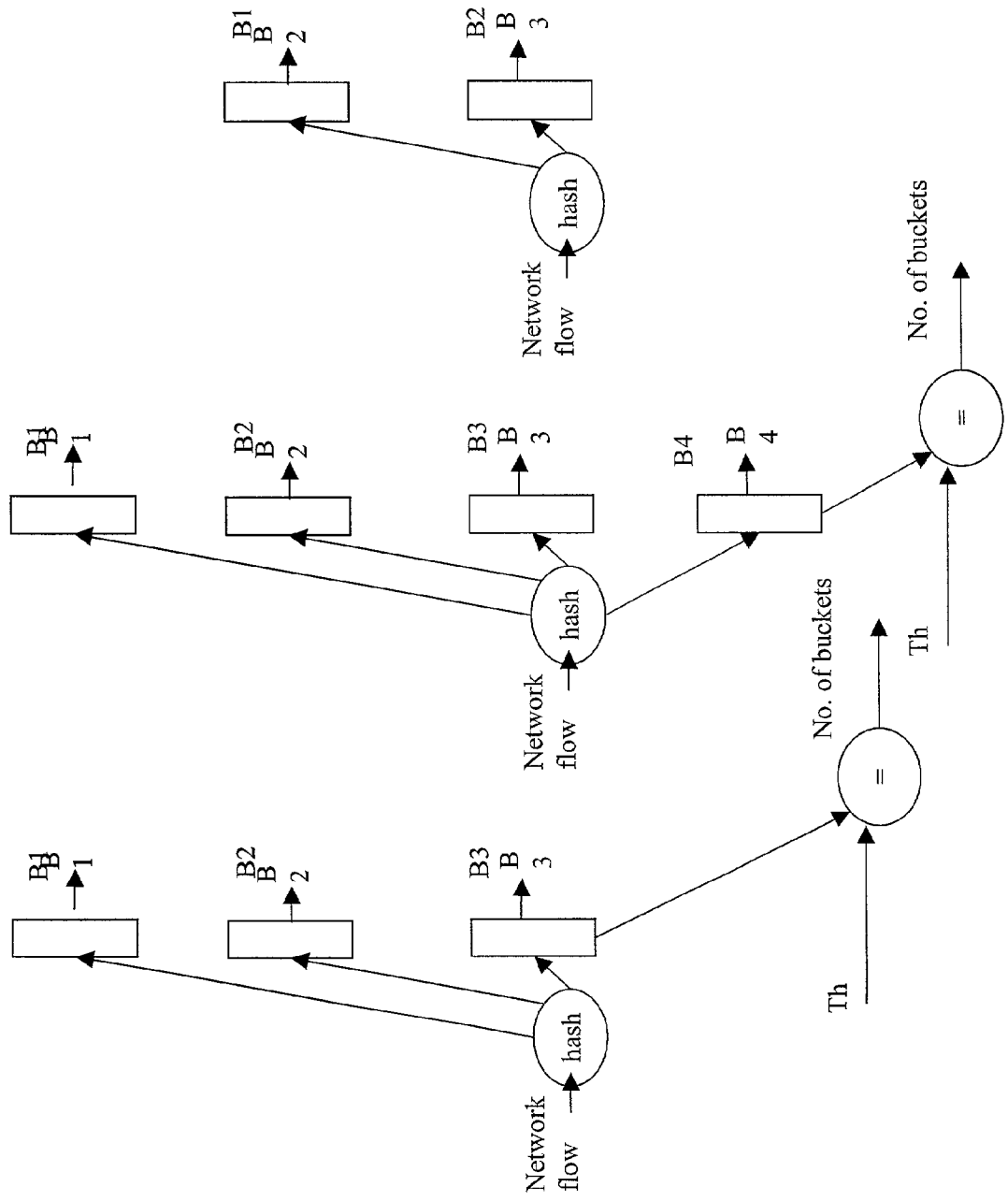
FIG. 8 is a diagram depicting an alternative technique to gather statistics for use in algorithms that determine sources of an attack.

Referring to FIG. 8, a second method is that instead of using just thresholds and values inside a given bucket, the monitoring process 32 also sets thresholds on the number of buckets. As the gateway 26 or data collector 28 approaches a bucket threshold "Th", the gateway 26 or data collector 28 have the ability to take several buckets $B_1$-$B_3$ and divide them in more buckets $B_1$-$B_4$ or combine them into fewer bucket $B_1$-$B_2$.

The function of the variable number of buckets is to dynamically adjust the monitoring process to the amount of traffic and number of flows, so that the monitoring device (e.g., gateway 26 or data collector 28) is not vulnerable to DoS attacks against its own resources. The variable number of buckets also efficiently identifies the source(s) of attack by breaking down traffic into different categories (buckets) and looking at the appropriate parameters and thresholds in each bucket. Thus, with multi-level analysis as discussed in FIGS. 6 and 7, traffic is monitored at multiple levels of granularity, from aggregate to individual flows. Multi-level analysis can be applied to all types of monitoring (i.e. TCP packet ratios, repressor traffic, etc. discussed below) except TCP SYN proxying (because the latter requires per-connection monitoring of all half-open connections as discussed below).

The monitoring process 32 has the gateway 26 or the data collectors 28 keep track of a metric (such as packet ratio) for each of n traffic buckets. (If n=1, the monitoring process 32 tracks the metric for all traffic in the aggregate.) The monitoring process 32 places packets into buckets according to a hash function of the source or destination address. If the metric in any bucket exceeds a given "suspicious" threshold, that bucket is split into several smaller buckets, and the metric is tracked individually for each new bucket. In the limit, each bucket can correspond to a single flow (source address/port and destination address/port pair). The resulting per-flow monitoring is resilient to denial-of-service attacks. If the number of buckets exceeds a given memory limit (for example, due to a many-flow spoofing attack), several fine-grain buckets can be aggregated into a single coarse-grain bucket. The hash function for placing packets into traffic buckets is secret and changes periodically, thwarting attacks based on carefully chosen addresses.

In the worst case, an attacker actually spoofs packets from all possible addresses. An IP address, for example is 32 bits long. This address length allows for approximately 4 billion possible random addresses and makes it impossible for the gateway at the victim site 12 to identify the attacker. In that worst case, the gateway 26 calls the control center, indicates the address of the gateway 26, and conveys that the gateway 26 is receiving unreasonably high levels of random traffic. The control center 24 contacts the data collectors 28. The control center 24 analyzes the statistics collected by the data collectors 28 to try to determine the source of the traffic.

Egress filtering is a recommended Internet 14 best practice procedure that does not allow any packets out of a network unless the source address belongs to that network. Egress filtering prevents hosts on that network from sending out packets with completely random source addresses. Rather, the space of usable fake addresses is limited by the size of the host's network address space, and may range up to 24 bits rather than the full 32 bits. If an attacker is attacking from a network that performs egress filtering, then all the attack traffic reaching a victim will fall into a smaller number of buckets, those corresponding to the source network address. In this way, the gateway 26 can identify the approximate source of the attack without necessarily relying on the control center or data collectors.

Several methods can be used separately or in combination to identify, malicious traffic flows. For example, the gateway 26 can detect DoS attacks and identify malicious flows or source addresses using at least one or more of the following methods including: analyzing packet ratios of TCP-like traffic; analyzing "repressor" traffic for particular types of normal traffic; performing TCP handshake analysis; performing various types of packet analysis at packet layers 3-7; and logging/historical analysis.

Packet Ratios for TCP-like Traffic

The Transmission Control Protocol (TCP) is a protocol in which a connection between two hosts, a client C, e.g. a web browser, and a server S, e.g. a web server, involves packets traveling in both directions, between C and S and between S and C. When C sends data to S and S receives it, S replies with an ACK ("acknowledgement") packet. If C does not receive the ACK, it will eventually try to retransmit the data to S, to implement TCP's reliable delivery property. In general, a server S will acknowledge (send an ACK) for every packet or every second packet.

Figure 9:
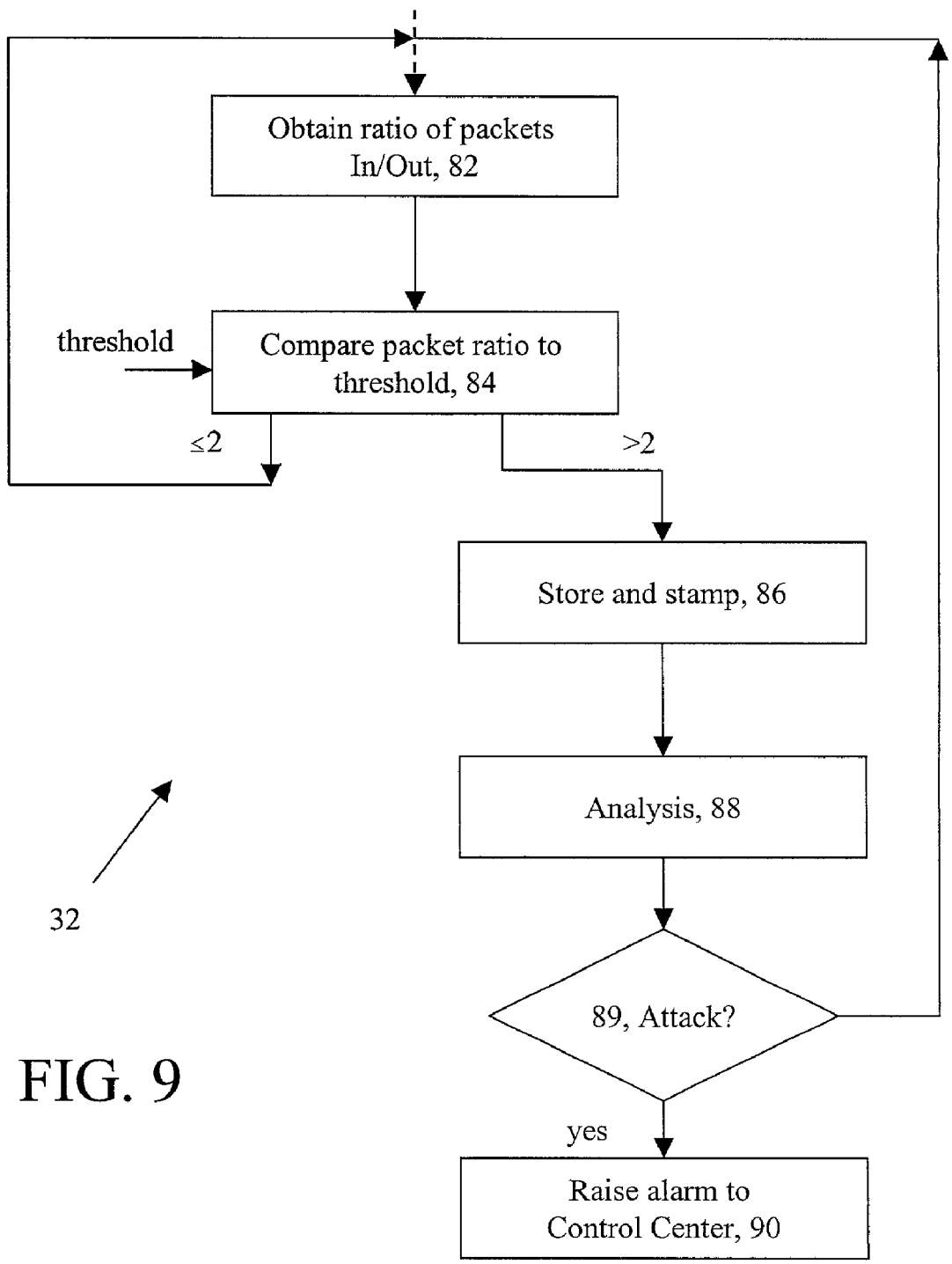
FIG. 9 is flow chart depicting a process to determine receipt of bad TCP traffic.

Referring to FIG. 9, the monitoring process in the gateway 26 can examine 82 a ratio of incoming to outgoing TCP packets for a particular set of machines, e.g. web servers. The monitoring process can compare 84 the ratio to a threshold value. The monitoring process can store 86 this ratio, time stamp it, etc. and conduct an ongoing analysis 88 to determine over time for example how much and how often it exceeds that ratio. As the ratio grows increasingly beyond 2:1, it is an increasing indication that the machines are receiving bad TCP traffic, e.g. packets that are not part of any established TCP connection, or that they are too overloaded to acknowledge the requests. This ratio is one of the parameters measured using the multiple-bucket algorithm described previously.

The gateway 26 divides traffic into multiple buckets, e.g. by source network address, and tracks the ratio of ingoing to outgoing traffic for each bucket. As the ratio for one bucket becomes skewed, the gateway 26 may subdivide that bucket to obtain a more detailed view. The gateway 26 raises 90 a warning or alarm to the data center 24 and/or to the administrators at the victim site 12.

Repressor Traffic

The phrase "repressor traffic" as used herein refers to any network traffic that is indicative of problems or a potential attack in a main flow of traffic. A gateway 26 may use repressor traffic analysis to identify such problems and stop or repress a corresponding attack.

One example of repressor traffic is ICMP port unreachable messages. These messages are generated by an end host when it receives a packet on a port that is not responding to requests. The message contains header information from the packet in question. The gateway 26 can analyze the port unreachable messages and use them to generate logs for forensic purposes or to selectively block future messages similar to the ones that caused the ICMP messages.

TCP Handshake Analysis

A TCP connection between two hosts on the network is initiated via a three-way handshake. The client, e.g. C, sends the server, e.g. S, a SYN ("synchronize") packet. S the server replies with a SYN ACK ("synchronize acknowledgment") packet. The client C replies to the SYN ACK with an ACK ("acknowledgment") packet. At this point, appropriate states to manage the connection are established on both sides.

During a TCP SYN flood attack, a server is sent many SYN packets but the attacking site never responds to the corresponding SYN ACKs with ACK packets. The resulting "half-open" connections take up state on the server and can prevent the server from opening up legitimate connections until the half-open connection expires, which usually takes 2-3 minutes. By constantly sending more SYN packets, an attacker can effectively prevent a server from serving any legitimate connection requests.

Figure 10:
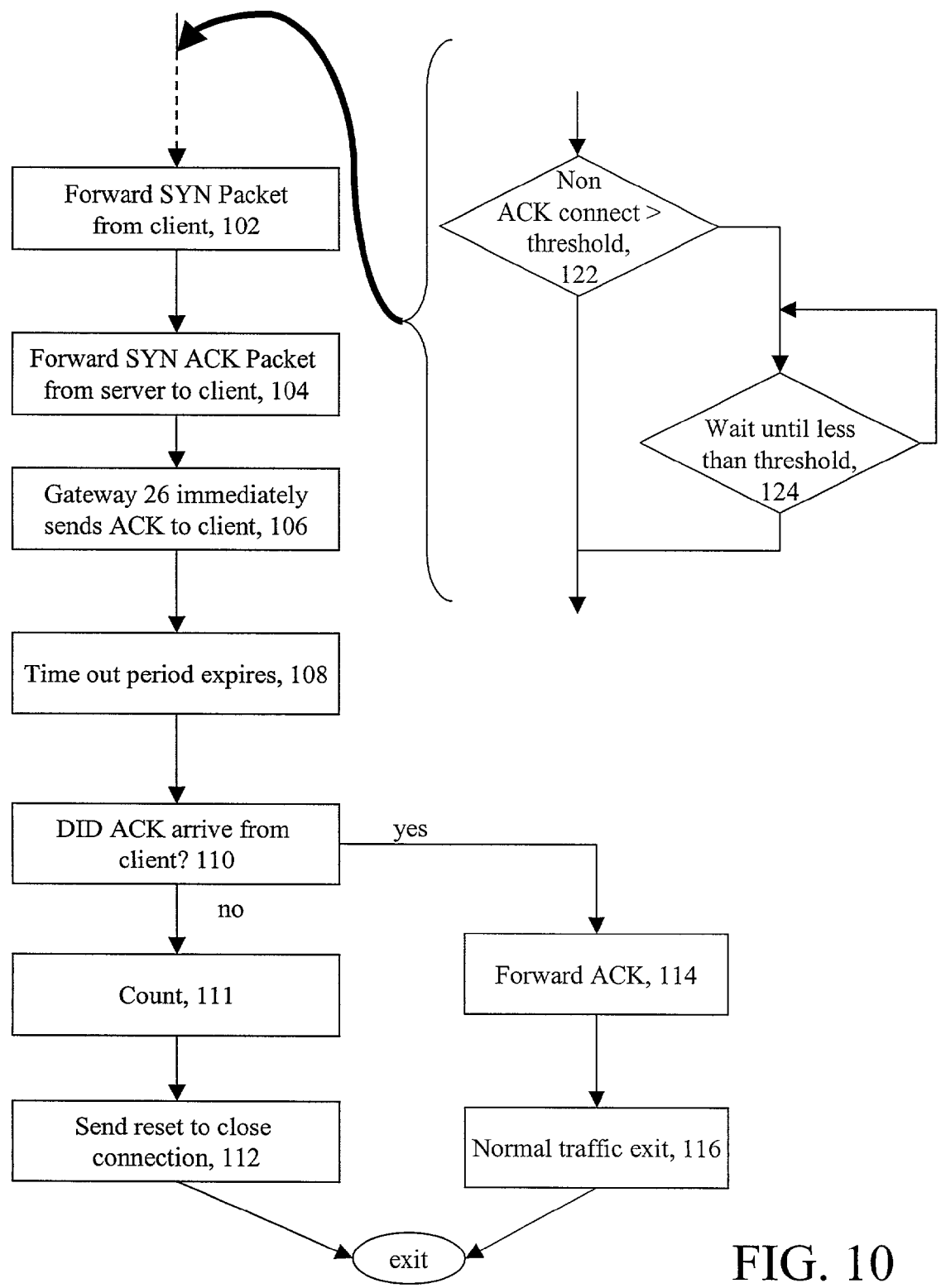
FIG. 10 is flow chart depicting a process to defend against setup time connection attacks.

Referring to FIG. 10, in an active configuration, a gateway 26 can defend against SYN flood attacks. During connection setup, the gateway forwards 102 a SYN packet from a client to a server. The gateway forwards 104 a resulting SYN ACK packet from a server to client and immediately sends 106 ACK packet to the server, closing a three-way handshake. The gateway maintains the resulting connection for a timeout period 108. If the ACK packet does not arrive from client to server 110, the gateway sends 112 a RST ("reset") to the server to close the connection. If the ACK arrives 114, gateway forwards 116 the ACK and forgets 118 about the connection, forwarding subsequent packets for that connection. A variable timeout 120 period can be used. The variable time out period can be inversely proportional to number of connections for which a first ACK packet from client has not been received. If gateway 26 is placed inline in the network, when number of non-ACK'ed connections reaches a configurable threshold 122, the gateway will not forward any new SYNs until it finishes sending RSTs for those connections.

In a passive configuration, a gateway 26 can similarly keep track of ratios of SYNs to SYN ACKs and SYN ACKs to ACKs, and raise appropriate alarms when a SYN flood attack situation occurs.

Layer 3-7 Analysis

With layer 3-7 analysis, the gateway 26 looks at various traffic properties at network packet layers 3 through 7 to identify attacks and malicious flows. These layers are often referred to as layers of the Open System Interconnection (OSI) reference model and are network, transport, session, presentation and application layers respectively. Some examples of characteristics that the gateway may look for include:

1. Unusual amounts of IP fragmentation, or fragmented IP packets with bad or overlapping fragment offsets.

2. IP packets with obviously bad source addresses, or ICMP packets with broadcast destination addresses.

3. TCP or UDP packets to unused ports.

4. TCP segments advertizing unusually small window sizes, which may indicate load on server, or TCP ACK packets not belonging to a known connection.

5. Frequent reloads that are sustained at a rate higher than plausible for a human user over a persistent HTTP connection.

Logging and Historical Traffic Analysis

The gateways 26 and data collectors 28 keep statistical summary information of traffic over different periods of time and at different levels of detail. For example, a gateway 26 may keep mean and standard deviation for a chosen set of parameters across a chosen set of time-periods. The parameters may include source and destination host or network addresses, protocols, types of packets, number of open connections or of packets sent in either direction, etc. Time periods for statistical aggregation may range from minutes to weeks. The device will have configurable thresholds and will raise warnings when one of the measured parameters exceeds the corresponding threshold.

The gateway 26 can also log packets. In addition to logging full packet streams, the gateway 26 has the capability to log only specific packets identified as part of an attack (e.g., fragmented UDP packets or TCP SYN packets that are part of a SYN flood attack). This feature of the gateway 26 enables administrators to quickly identify the important properties of the attack.

Building a DoS-resistant Network

The network of gateways 26, data collectors 28, and control center 24 are made DoS resistant by combining and applying several techniques. These techniques include the use of SYN cookies and "hashcash" to make devices more resistant to SYN floods and other attacks that occur at connection setup time. Also, the data center can use authentication and encryption for all connections. Private/public key pairs are placed on machines before deployment to avoid man-in-the-middle attacks. The control center 24 can have multiple physical connections from different upstream network service providers. The network over which the data center communicates between gateways and data collectors is a private redundant network that is inaccessible to attackers.

Information exchange between gateways/data collectors and the control center is efficient by transferring only statistical data or minimal header information, and by compressing all data.

This application includes an APPENDIX A attached hereto and incorporated herein by reference. APPENDIX A includes Click code for monitor software.

This application also includes an APPENDIX B attached hereto and incorporated herein by reference. APPENDIX B sets out additional modules for a Click Router that pertains to thwarting DoS attacks. "Click" is a modular software router system developed by The Massachusetts Institute of Technology's Parallel and Distributed Operating Systems group. A Click router is an interconnected collection of modules or elements used to control a router's behavior when implemented on a computer system.

Other embodiments are within the scope of the appended claims.

What is claimed is:

1. A method executed on a device for defending a server against SYN flood attacks, the method comprises:
   during a connection setup initiated by sending a SYN packet from a client to a server;
      forwarding a received SYN ACK packet from the server to the client;
      maintaining a half-open connection for a variable timeout period and if an ACK packet does not arrive from the client to the server,
   sending a RST by the device to the server to cause the server to close the half-open connection.

2. The method of claim 1 wherein the device is a gateway device that is disposed inline between the server and a network that the client sends SYN packet requests on, and if the ACK packet does arrive from the client to the server,
   establish an open connection by the server.

3. The method of claim 2 wherein if the ACK packet does arrive from the client to the server, the gateway forwards the ACK to the server to maintain the connection, with forwarding the ACK packet by the gateway further comprises:
   forwarding subsequent packets for the open connection to the server.

4. The method of claim 2 wherein if the gateway is inline with the network, maintaining further comprises:
   tracking the number of non-ACK'ed connections requested from the server; and
   determining when the number of non-ACK'ed connections reaches a threshold; and
   pausing the gateway from forwarding any new SYN messages until the gateway sends resets to the server to reset at least some of the non-ACK'ed connections.

5. The method of claim 1 wherein forwarding the ACK packet comprises:
   forwarding subsequent packets for the connection.

6. The method of claim 1 wherein the variable time out period is inversely proportional to number of connections for which expected ACK packets from the client have not been received.

7. The method of claim 1 wherein the device is a gateway device that is disposed near the server.

8. The method of claim 1 wherein forwarding a received SYN ACK packet further comprises immediately sending an ACK packet to the server.

9. A method executed on a gateway for defending a server against SYN flood attacks, the method comprises:
   during a connection setup initiated by sending a SYN packet from a client to a server;
   tracking ratios of SYNs to SYN ACKs;
   comparing the ratios to threshold values; and
   sending an alarm to a control center when the ratio exceeds a threshold value to indicate to the control center that the server is under a SYN flood attack.

10. The method of claim 9 wherein the gateway is disposed to sample network traffic flow between the server and a network.

11. The method of claim 9, wherein the threshold is a first threshold, the method further comprising:
    tracking ratios of SYN ACK packets to ACK packets;
    comparing the ratio to a second threshold value; and
    sending an alarm to a control center when the ratio of SYN ACK packets to ACK packets exceeds the second threshold to indicate to the control center that the server is under a SYN flood attack.

12. A gateway device disposed between a data center and a network for thwarting denial of service attacks on the data center, the gateway device comprises:
    a computing device comprising:
    a monitoring process that monitors network connection setups initiated by sending SYN packets from a client to the data center, the monitoring process including a
    SYN ACK forward process to forward received SYN ACK packets from a server to the client;
    a process to determine a variable time out period;
    a process to maintain a half open connection open for the variable timeout period;
    a reset process to send a reset packet to the server to cause the server to close the half-open connection when an ACK packet does not arrive from the client to the server during the timeout period; and a packet forwarding process to forward the ACK packet when the ACK packet is received from the client by the server, and to establish an open connection.

13. The gateway of claim 12 wherein the variable time out period is inversely proportional to number of connections for which a first ACK packet from client has not been received.

14. The gateway of claim 12 wherein the gateway is disposed inline between the server and a network that the client sends SYN packet requests on.

15. The gateway of claim 14 wherein the packet forward process to forward the ACK packet forwards subsequent packets for the connection and thereafter stops monitoring the connection.

16. The gateway of claim 14 wherein if the gateway is inline with the network, the gateway tracks the number of non-ACK'ed connections requested from the server and when the number of non-ACK'ed connections reaches a threshold, inhibits the gateway from forwarding any new SYN messages until the gateway sends resets to the server to reset at least some of the non-ACK'ed connections.

17. The gateway of claim 12 wherein the forward process further comprises a process to immediately send an ACK packet to the server.

18. A gateway device disposed between a data center and a network for thwarting denial of service attacks on the data center, the gateway device comprising:
 a computing device comprising a monitoring process that monitors network connection setups initiated by sending SYN packets from a client to the data center, the monitoring process comprising a process to:
 determine ratios of SYN packets to SYN ACK packets;
 compare the determined ratio to a threshold value; and
 send an alarm to a control center when at least one of the ratio exceeds a threshold value to indicate to the control center that the server is under a SYN flood attack.

19. The device of claim 18 wherein the gateway is disposed inline to sample network traffic flow between the server and a network.

20. The gateway device of claim 18 wherein the threshold is a first threshold, and the monitoring process further comprising a process to:
 determine ratios of SYN ACK packets to ACK packets;
 compare the determined ratio to a second threshold value; and
 send an alarm to a control center when the ratio of SYN ACK packets to ACK packets exceeds the second threshold value to indicate to the control center that the server is under a SYN flood attack.

21. A computer program product residing on a computer readable medium for defending a server against SYN flood attacks, the computer program product executed on a device, the computer program product comprising instructions to cause the device to:

forward, in response to a SYN packet received from a client to by the server, a SYN ACK packet from the server to the client;
 maintain a half-open connection open for a variable timeout period; and
 close the half-open connection by sending a RST to the server if an ACK packet does not arrive from the client to the server; or
 forward a received ACK to the server if the ACK packet does arrive from the client to the server.

22. The computer program product of claim 21 wherein the device is a gateway device that is disposed inline between the server and a network that the client sends SYN packet requests on.

23. The computer program product of claim 22 wherein instructions to forward the ACK packet by the gateway further comprise instructions to:
 forward subsequent packets for the connection and stop monitoring the connection.

24. The computer program product of claim 22 wherein instructions to forward the ACK packet by the gateway further comprise instructions to:
 forward subsequent packets for the connection.

25. The computer program product of claim 21 wherein the variable time out period is inversely proportional to number of connections for which expected ACK packets from the client have not been received.

26. The computer program product of claim 21 wherein instructions to forward a received SYN ACK packet further comprises instructions to immediately send an ACK packet to the server.

27. A computer program product residing on a computer readable medium for defending a server against SYN flood attacks, the computer program product executed on a device, the computer program product comprising instructions to cause the device to:
 during a connection setup initiated by sending a SYN packet from a client to a server;
 determine ratios of SYNs to SYN ACKs;
 compare the determined ratios to threshold values; and
 send an alarm message to a control center when at least one of the ratios exceeds a threshold value to indicate to the control center that the server is under a SYN flood attack.

28. The computer program product of claim 27 wherein the threshold is a first threshold, and the computer program product further comprises instructions to:
 determine ratios of SYN ACK packets to ACK packets;
 compare the determined ratio to a second threshold value; and
 send an alarm to a control center when the ratio of SYN ACK packets to ACK packets exceeds the second threshold value to indicate to the control center that the server is under a SYN flood attack.

* * * * *